United States Patent
Wojnowski

[19]

[11] Patent Number: 6,059,141
[45] Date of Patent: May 9, 2000

[54] VEHICLE UNDERBODY STORAGE CONTAINER

[75] Inventor: Stanley J. Wojnowski, Mendon, Mass.

[73] Assignee: United Plastics Fabricating, Inc., N. Andover, Mass.

[21] Appl. No.: 09/027,338

[22] Filed: Feb. 20, 1998

[51] Int. Cl.[7] .................................................. B65D 43/22
[52] U.S. Cl. ......................... 220/849; 220/747; 220/326
[58] Field of Search ..................................... 220/848, 844, 220/849, 378, 789, 798, 801, 804, 913, DIG. 27, 89.1, 745, 747, 4.22, 4.21, 845, 476, 480, 324, 326

[56] References Cited

U.S. PATENT DOCUMENTS

| | | |
|---|---|---|
| 1,986,057 | 1/1935 | Hackworth . |
| 2,028,030 | 1/1936 | Walker ..................................... 220/849 |
| 3,025,947 | 3/1962 | Hammer . |
| 3,747,796 | 7/1973 | Kneier et al. ............................... 220/29 |
| 3,851,789 | 12/1974 | Case et al. ................................ 220/4.23 |
| 4,662,515 | 5/1987 | Newby, Sr. ............................... 206/349 |
| 4,685,695 | 8/1987 | LeVee ................... 280/423 B |
| 4,733,898 | 3/1988 | Williams ............................... 296/24 R |
| 4,739,577 | 4/1988 | Lanius ....................................... 43/54.1 |
| 5,065,884 | 11/1991 | Naritomi et al. ........................ 220/264 |
| 5,193,706 | 3/1993 | Hanna et al. ............................ 220/324 |
| 5,601,206 | 2/1997 | Haas et al. ............................... 220/527 |

Primary Examiner—Stephen Castellano
Attorney, Agent, or Firm—Hamilton, Brook, Smith & Reynolds, P.C.

[57] ABSTRACT

A vehicle underbody storage container includes an enclosure having a front wall with an opening therethrough. A resilient gasket surrounds the opening. A portion of the gasket protrudes outwardly beyond the front wall. A door is secured to the enclosure with a hinge. The door has an inner surface with the groove formed therein for engaging with the gasket. The gasket compresses within the groove to seal between the door and the enclosure.

22 Claims, 5 Drawing Sheets

VEHICLE UNDERBODY STORAGE CONTAINER

BACKGROUND OF THE INVENTION

It is common for a toolbox to be mounted under the body, bed or trailer of a truck for storing tools and supplies needed by the truck driver while on the road. The placement of a tool box in such a location provides extra storage capacity without sacrificing space within the truck cab or cargo area. A drawback is that the tool box is exposed to rain as well as damaging road conditions such as flying stones or just general harsh treatment. Since the tool boxes are typically made of steel, they are prone to rusting, corroding or denting. In addition, these tool boxes sometimes experience leaking which can cause damage to the contents contained therein.

SUMMARY OF THE INVENTION

The present invention provides a vehicle underbody storage container which does not rust, corrode, dent or leak. The storage container includes an enclosure having a front wall with an opening therethrough. The opening has a resilient gasket surrounding the opening. A portion of the gasket protrudes outwardly beyond the front wall. A door is secured to the enclosure with a hinge and has an inner surface with a groove formed therein for engaging with the gasket. The gasket compresses within the groove to seal between the door and the enclosure.

In preferred embodiments, the container is formed of plastic and is rectangular in shape. The opening has a rim with the gasket being secured to and extending along the rim. The door preferably has four side edges. The enclosure has a lip extending outwardly beyond the front wall for covering three adjacent side edges of the door, preferably the top and two side edges. The lip limits the amount of water that can enter the gap between the door and the front wall by covering the gap therebetween. A latch system secures the door in a closed position. A vent for venting the enclosure includes a lower exterior opening in the enclosure which is in communication with an upper interior opening in the enclosure by a passage extending therebetween.

Forming the present invention vehicle underbody storage container from plastic prevents the container from rusting, corroding and denting. The unique manner in which the present invention storage container is sealed and vented prevents water from entering or collecting within the container so that the contents do not become damaged.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 2:
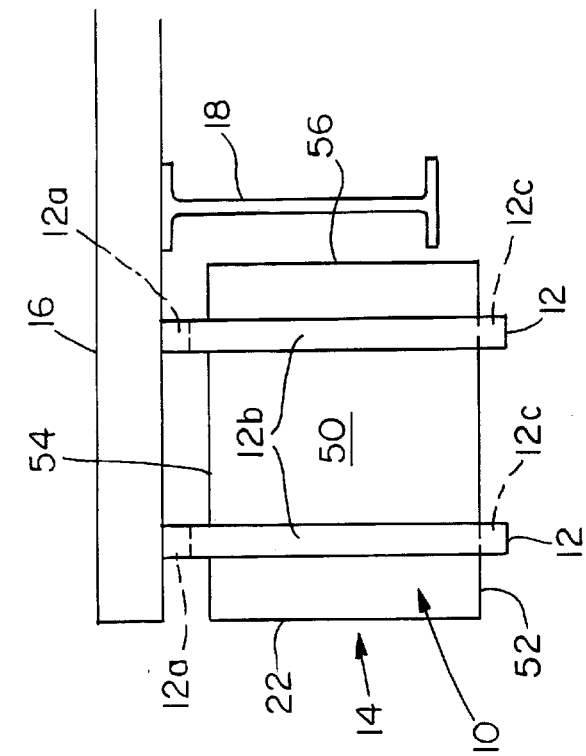
FIG. 2 is a side view of the present invention tool box mounted to the trailer/flatbed.

Referring to FIGS. 1, 2, 3 and 4, tool box 10 is made of plastic and has a generally rectangular enclosure portion 10a. Enclosure portion 10a includes a bottom panel 52, a top panel 54, a front panel 24, a rear panel 56 and two side panels 50. Panels 24, 50, 52, 54 and 56 are preferably individual panels which are nitrogen welded together. Alternatively, some of the panels can be formed by making 90° bends. The joints between the panels are preferably grooved. Front panel 24 has a generally rectangular opening 26 with curved corners for providing access to the interior 58 of enclosure portion 10a. A downwardly opening or swinging rectangular plastic door 14 is mounted to front panel 24 of enclosure portion 10a with two hinges 30 for covering and sealing opening 26. Door 14 can be latched shut with two lockable latches 14a as shown. Smaller doors 14 may only require one latch 14a while larger doors 14 may require three latches 14. Enclosure portion 10a has a lip 22 for covering the top 13a and side 13b edges of door 14 and a gasket 20 for engaging a mating groove 28 of door 14. These features prevent the entry of water into tool box 10.

Figure 1:
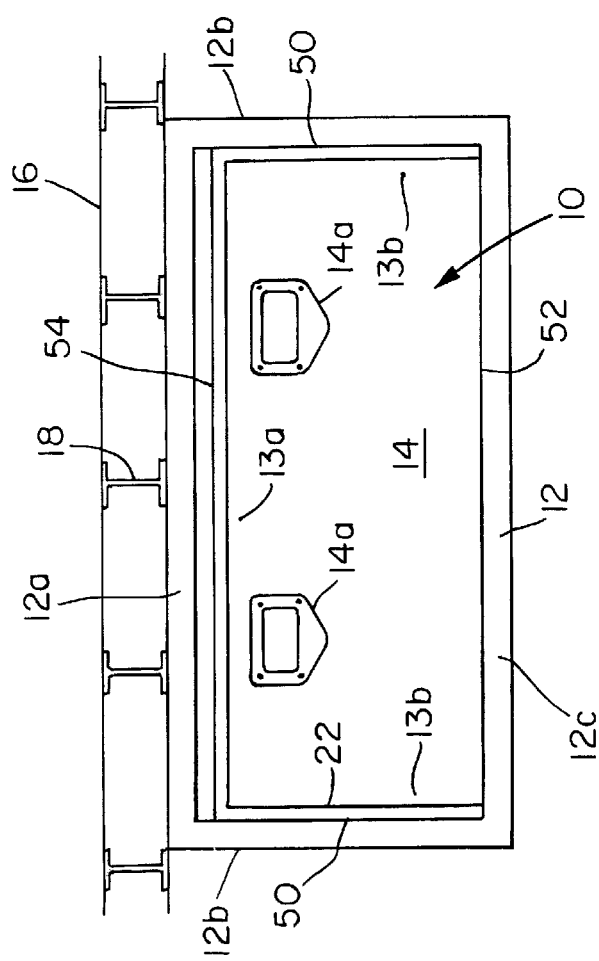
FIG. 1 is a front view of the present invention tool box mounted to the underbody of a trailer/flatbed of a truck.

In use, tool box 10 is typically mounted to the I beams 18 under the trailer or flatbed deck 16 of a truck with two steel rectangular hoop brackets 12 (FIGS. 1 and 2). The door 14 of tool box 10 faces outwardly and is preferably flush with the edge of deck 16. Each bracket 12 has an upper portion 12a, two side portions 12b and a lower portion 12c. The upper portions 12a of brackets 12 are mounted to the bottom of the I beams 18 by welding or bolting. The bottom of tool box 10 rests on and is supported by the lower portions 12c of brackets 12. Tool box 10 secured to brackets 12 by bolting bottom panel 52 to the lower portions 12c of brackets 12. Brackets 12 are spaced apart from each other so that the door 14 and rear panel 56 of tool box 10 extend about four inches beyond brackets 12. About ¼ of an inch gap is provided between panels 50 and 54 of tool box 10 and portions 12a and 12b of brackets 12 for thermal expansion.

Brackets 12 are preferably formed from square steel tubing with portions 12a, 12b and 12c being separate pieces that are welded together. Alternatively, brackets 12 can be formed from solid bar stock, solid round stock, round tubing, angle stock or channel stock. Additionally, brackets 12 can be formed by bending a single piece of stock into the shape of a rectangular hoop. Furthermore, although brackets 12 are preferably formed of steel, alternatively, brackets 12 can be made of other suitable materials such as aluminum. If brackets 12 are aluminum, brackets 12 are bolted to I beams 18 since the I beams 18 are typically made of steel and aluminum cannot be welded to steel.

Figure 3:
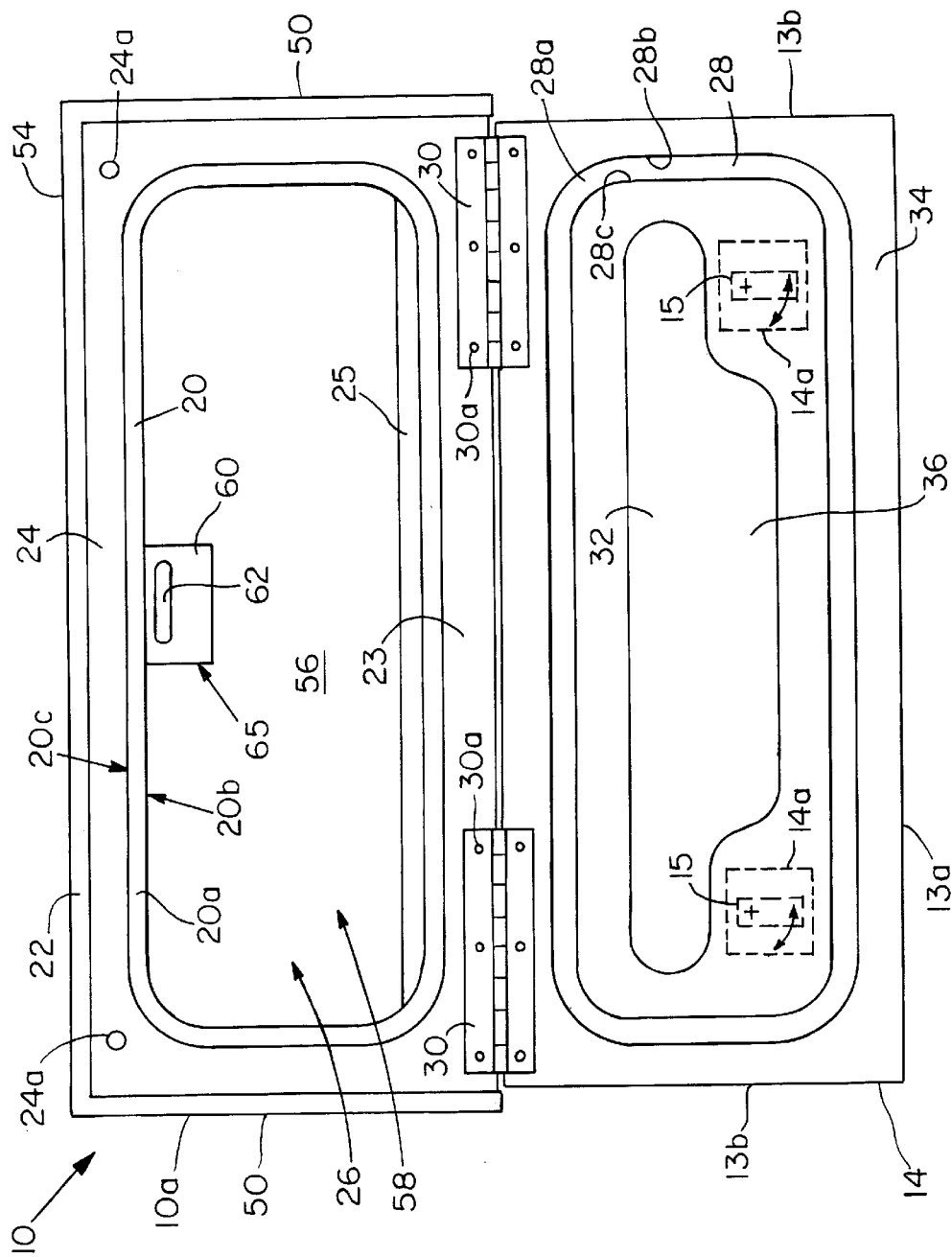
FIG. 3 is a front view of the tool box with the door opened.
Figure 4:
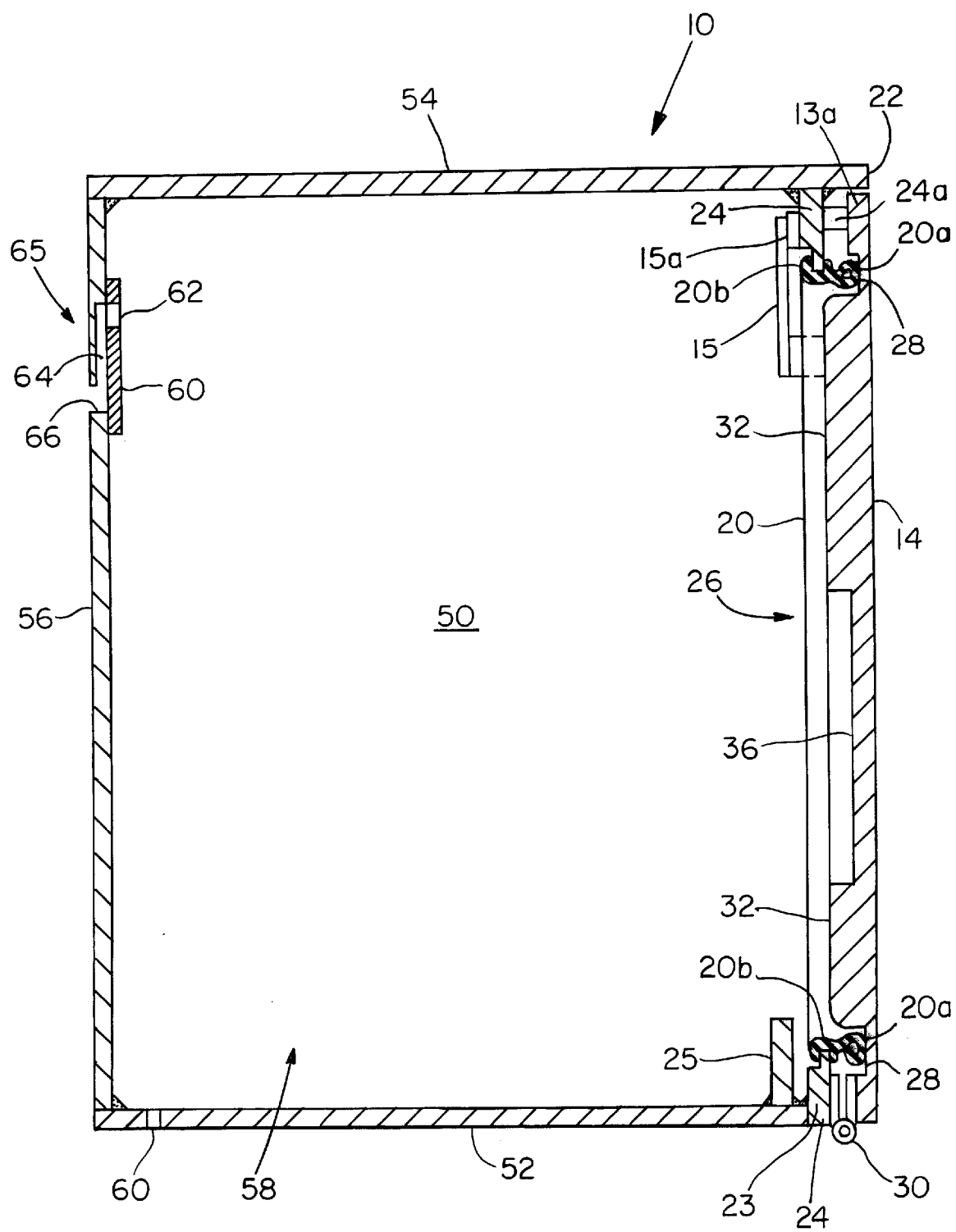
FIG. 4 is a cross-sectional view of the tool box showing the door in the closed position.
Figure 5:
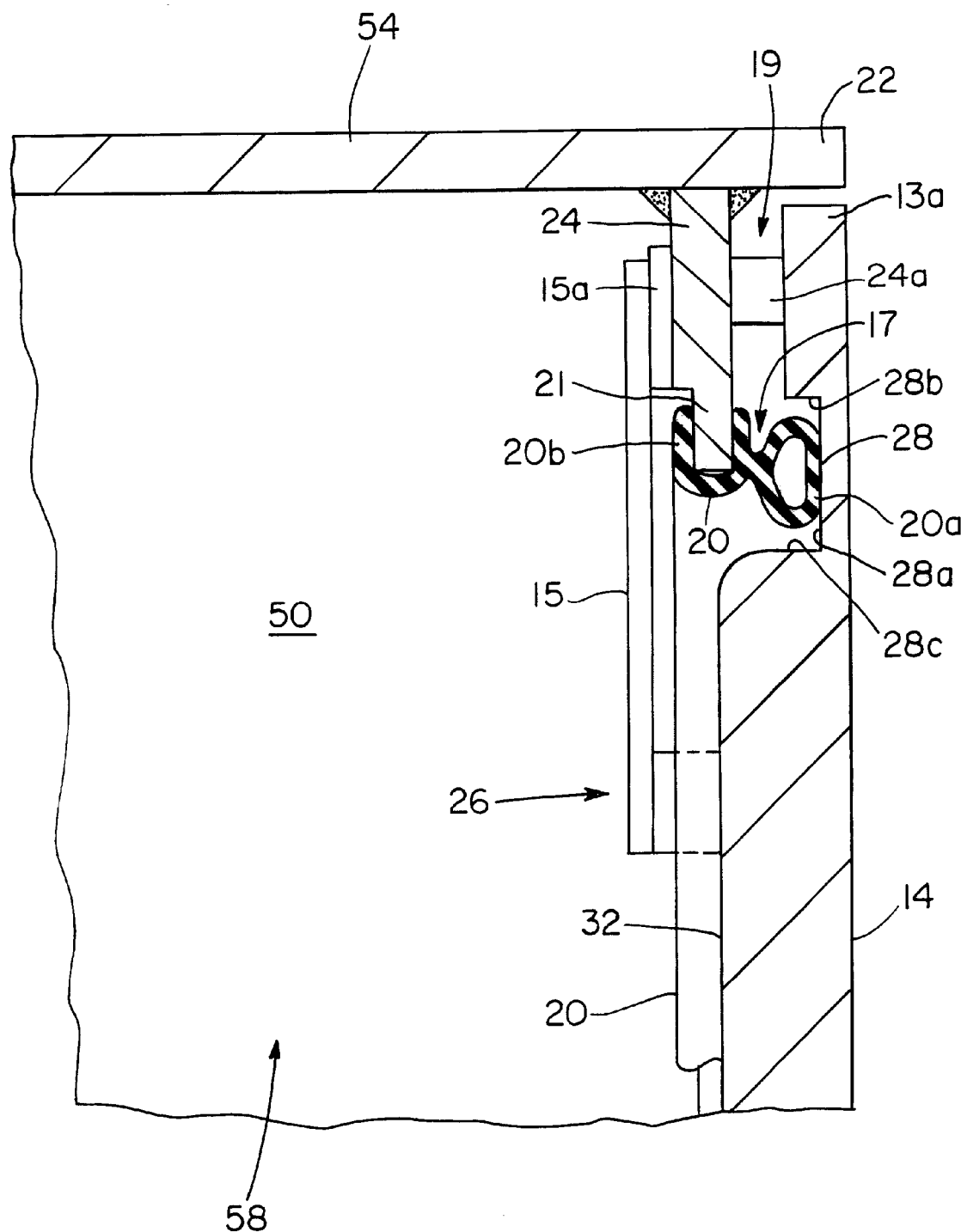
FIG. 5 is an enlarged cross-sectional view of the upper sealing region of the tool box.

Referring to FIGS. 3, 4 and 5, a more detailed description of tool box 10 is described below. Two bumpers 24a extend outwardly from the top of front wall 24 for preventing door 14 from crushing gasket 20 and forms a gap 19 between the opposing faces of door 14 and front wall 24 (FIGS. 4 and 5). The top panel 54 and side panels 50 extend outwardly beyond front wall 24 to form a lip 22 at the top and side edges of front wall 24. Lip 22 extends beyond front wall 24 a distance approximately equal to the thickness of door 14 plus the thickness of bumpers 24*a*. Door 14 is mounted to the lower portion 23 of front wall 24 with hinges 30 and fasteners 30*a*. Lower portion 23 is located on the side of front wall 24 that lip 22 does not extend along. When door 14 is closed, lip 22 covers the top 13*a* and side 13*b* edges of door 14, thereby covering the gap 19 between the opposing faces of door 14 and front wall 24. This reduces the amount of water that can enter gap 19 between the faces of door 14 at front wall 24 from the top and the sides of tool box 10 since the water does not have a direct path thereto.

Gasket 20 is formed from a resilient material which is secured to and covers the edge of opening 26. Gasket 20 is preferably formed from neoprene but alternatively can be made of other suitable waterproof resilient polymeric materials such as rubber. Gasket 20 has a front portion 20*a* for sealing against door 14 and a rear portion 20*b* having a slot for securing to a lip 21 on the edge of opening 26. The front portion 20*a* of gasket 20 extends outwardly generally perpendicularly from front wall 24. A protective wall 25 extends across bottom panel 52 behind front wall 24 slightly above gasket 20 for protecting gasket 20 from being damaged when removing contents from the interior 58 of enclosure portion 10*a*. Groove 28 formed on the inner surface of door 14 has a pattern matching that of gasket 20 for engaging the front portion 20*a* of gasket 20 when door 14 is swung upwardly along hinges 30 into the closed position. Groove 28 has a bottom 28*a*, an outer edge 28*b* and an inner edge 28*c*. Gasket 20 compresses against the bottom 28*a* of groove 28 for sealing therebetween. The inner surface of door 14 has a raised plastic portion 32 bordering groove 28 forming a stiffening member for stiffening door 14. Stiffening door 14 provides a more consistent seal between door 14 and gasket 20 because the door 14 is unable to bow outwardly away from gasket 20. Raised portion 32 increases the height of the inner edge 28*c* of groove 28 so that the height of the inner edge 28*c* is greater than the height of the outer edge 28*b*. Raised portion 32 preferably surrounds a recessed area 36 but, alternatively, can extend across the whole interior region bordering groove 28.

Water is prevented from entering tool box 10 in the following manner. Lip 22 prevents water from directly entering the gap 19 between the opposing faces of door 14 and front wall 24. This greatly reduces the amount of water that can enter gap 19. Water that has managed to leak past the lip 22 into gap 19 between front wall 24 and door 14 is blocked from moving directly toward opening 26 by the front portion 20*a* of gasket 20 which extends perpendicularly outwardly from front wall 24. The water can drain down around the front portion 20*a* of gasket 20 and exit tool box 10 at the lower portion 23 of front wall 24 since lip 22 does not extend below door 14. Gasket 20 preferably forms a channel 17 for channeling the water. Additional travel of water into opening 26 is prevented by the compression of the front portion 20*a* of gasket 20 against the bottom 28*a* of groove 28. Groove 28 provides an indirect path for water to travel from gap 19 to the sealed region formed between the front portion 20*a* of gasket 20 and the bottom 28*a* of groove 28 which reduces the amount of water moving towards the sealed region.

Tool box 10 is vented through rear panel 56 by vent 65. A plastic plate 60 (FIG. 4) having an upper slot 62 is secured and sealed with a gasket to the inner surface of rear panel 56 at about the top center of rear panel 56. A lower slot 66 is formed through rear panel 56 below slot 62. A passage 64 extends upwardly from lower slot 66 through the inner surface of rear panel 56 for communicating between lower slot 66 and upper slot 62. Plate 60 covers passage 64. This configuration allows the interior 58 of tool box 10 to be vented to the exterior through upper slot 62, passageway 64 and lower slot 66 while preventing water to enter the tool box 10 through the vent 65. Any water entering lower slot 66 is unable to move upwardly through passage 64 to enter enclosure portion 10*a* via upper slot 62. Vent 65 allows tool box 10 to breath which helps prevent the build up of water within tool box 10 from sweating or condensation. Any water collecting within tool box 10 can exit through small drain holes 60 within bottom panel 52. In addition, vent 65 helps cool tool box 10 and maintain a constant pressure therein.

Latches 14*a* each have a rotating mechanism 15 for engaging the edge of opening 26 to secure door 14 when closed. Two metal wear plates 15*a* protect the inner surface of front wall 24 from wear or damage by mechanisms 15. Latches 14*a* are preferably lockable with a key for security. Tool box 10 is preferably made from ½ inch thick textured PT2E polypropylene panels which is toughened with resins. The preferred resin is Amoco's AccTuf™ resin. As a result, tool box 10 does not rust or corrode and resists dents and dings. The outer dimensions of tool box 10 preferably range between 24×18×18 inches and 60×24×24 inches for standard sizes but alternatively can be larger or smaller.

Figure 7:
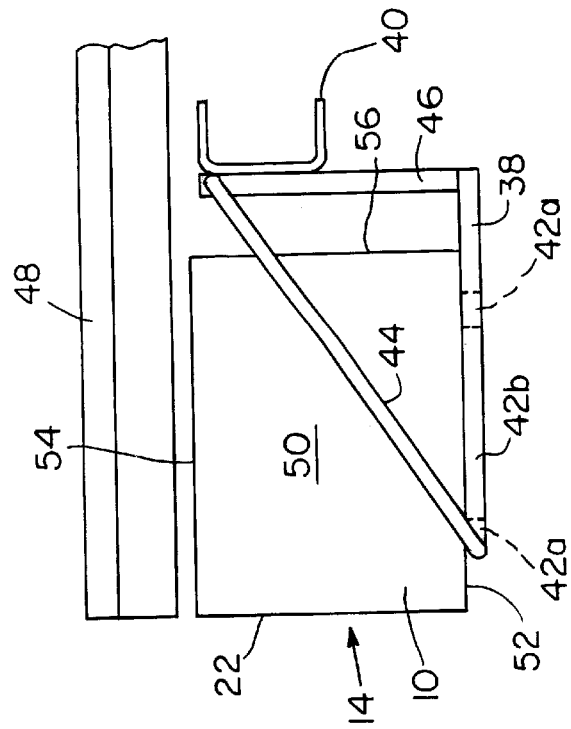
FIG. 7 is a side view of the present invention tool box mounted with the method depicted in FIG. 6.
Figure 6:
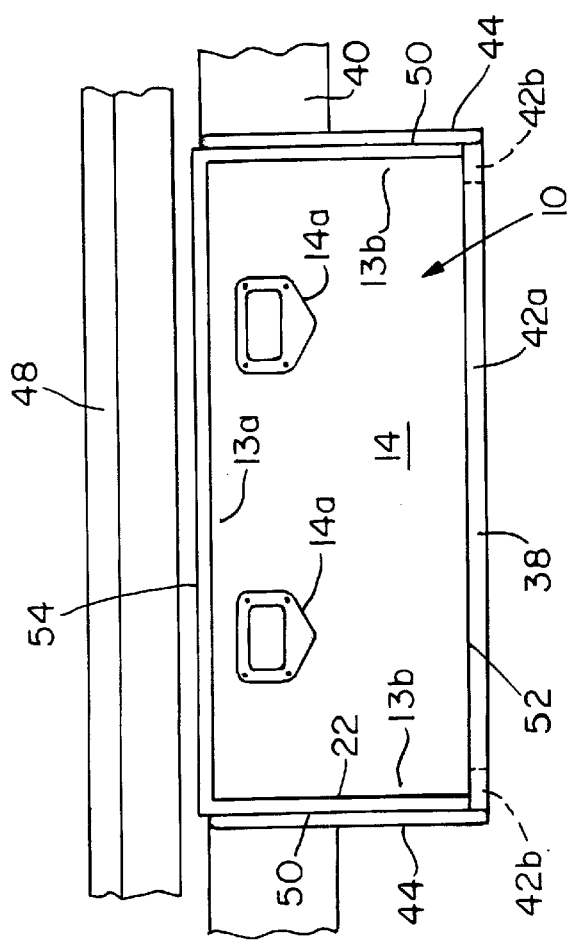
FIG. 6 is a front view of the present invention tool box mounted to the underbody of a trailer/flatbed with another preferred mounting method.

FIGS. 6 and 7 depict another preferred method of mounting tool box 10. Tool box 10 is supported under the trailer or flatbed deck 48 of a truck by a shelf-type bracket 38. Bracket 38 includes two side members 42*b* and two cross members 42*a* for supporting the bottom panel 52 of tool box 10. Two vertical members 46 extend upwardly from the rear ends of side members 42*b*. Two angled support members 44 extend from the front outer edges of side members 42*b* to the upper outer edges of vertical members 46 for providing strength to bracket 38. The vertical supports 46 are welded or bolted to frame member 40 of the trailer or flatbed. The top panel 54 of tool box 10 should be at least ¼ inch below deck 48. The bottom panel 52 of tool box 10 is bolted to cross members 42*a* and side members 42*b*. Door 14 preferably extends 2 inches beyond bracket 38 so that door 14 can fully open. The rear panel 56 extends about 4 inches beyond the rear cross member 42*a*.

Although members 42*a* and 42*b* preferably support and are bolted to bottom panel 52, alternatively, bracket 38 can be sized so that only cross members 42*a* support and are bolted to bottom panel 52. Bracket 38 is typically made from the same materials described for brackets 12.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

Although tool box 10 has been described to have front, rear, top and bottom panels or walls, these terms have been used to designate the positioning of those features relative to each other and are not intended to limit the orientation of tool box 10. In addition, tool box 10 does not have to be rectangular but can have some curved or angled surfaces.

Furthermore, although door 14 has been shown to open downwardly, alternatively, door 14 can swing open sideways. Finally, instead of being formed from plastic panels that are welded together, the enclosure portion 10*a* and/or the door 14 can be molded.

What is claimed is:

1. A vehicle underbody storage container comprising:

an enclosure having a front wall with an opening therethrough, a resilient gasket surrounding the opening, a portion of the gasket protruding outwardly beyond the front wall, a lip extending outwardly from the enclosure beyond the front wall; and a door secured to the enclosure with a hinge, the door having an inner surface with a groove formed therein for engaging with the gasket, the gasket compressing within the groove to seal between the door and the enclosure, the door having a side edge, the lip covering at least a portion of the side edge of the door.

2. The container of claim 1 in which the opening has a rim, the gasket secured to and extending along the rim.

3. The container of claim 2 in which the container is formed of plastic.

4. The container of claim 3 in which the container is rectangular in shape.

5. The container of claim 4 in which the door has four side edges, the lip extending along and covering three adjacent side edges of the door.

6. The container of claim 5 in which the lip covers a top and two side edges of the door.

7. The container of claim 6 further comprising a latch for securing the door in a closed position.

8. The container of claim 1 further comprising a vent for venting the enclosure, the vent comprising a lower exterior opening in the enclosure which is in communication with an upper interior opening in the enclosure by a passage extending therebetween.

9. The container of claim 1 further comprising a stiffening member on the door for stiffening the door.

10. A vehicle underbody storage container comprising:

an enclosure having a front wall with an opening therethrough, a resilient gasket surrounding the opening, a lip extending outwardly from the enclosure beyond the front wall; and a door secured to the enclosure with a hinge, the door having an inner surface with a groove formed therein for engaging with the gasket, the gasket compressing within the groove to seal between the door and the enclosure, the door having a side edge, the lip covering at least a portion of the side edge of the door.

11. The container of claim 10 in which the container is formed of plastic and is rectangular in shape.

12. The container of claim 11 in which the door has four side edges, the lip extending along and covering three adjacent side edges of the door.

13. The container of claim 12 in which the opening has a rim, the resilient gasket being secured to and extending along the rim.

14. The container of claim 10 further comprising a vent for venting the enclosure, the vent comprising a lower exterior opening in the enclosure which is in communication with an upper interior opening in the enclosure by a passage extending therebetween.

15. A method of sealing a vehicle underbody storage container, the container including an enclosure having a front wall with an opening therethrough, and a door secured to the enclosure with a hinge, the method comprising the steps of:

surrounding the opening with a resilient gasket, a portion of the gasket protruding outwardly beyond the front wall;

forming a groove in an inner surface of the door for engaging with the gasket, the gasket compressing within the groove to seal between the door and the enclosure; and extending a lip from the enclosure outwardly beyond the front wall for covering at least a portion of a side edge of the door.

16. The method of claim 15 in which the opening has a rim, the method further comprising the step of extending the gasket along the rim and securing the gasket thereto.

17. The method of claim 15 in which the container is rectangular in shape, the door having four side edges, the method further comprising the step of extending the lip along and covering three adjacent side edges of the door.

18. The method of claim 15 further comprising the step of securing the door in a closed position with a latch.

19. The method of claim 15 further comprising the step of venting the enclosure with a lower exterior opening in the enclosure which is in communication with an upper interior opening in the enclosure by a passage extending therebetween.

20. The method of claim 15 further comprising the step of stiffening the door with a stiffening member.

21. A vehicle underbody storage container comprising:

an enclosure having a front wall with an opening therethrough, a resilient gasket surrounding the opening, a portion of the gasket protruding outwardly beyond the front wall;

a door secured to the enclosure with a hinge, the door having an inner surface with a groove formed therein for engaging with the gasket, the gasket compressing within the groove to seal between the door and the enclosure; and a vent for venting the enclosure, the vent comprising a lower exterior opening in the enclosure which is in communication with an upper interior opening in the enclosure by a passage extending therebetween.

22. A method of sealing a vehicle underbody storage container, the container including an enclosure having a front wall with an opening therethrough, and a door secured to the enclosure with a hinge, the method comprising the steps of:

surrounding the opening with a resilient gasket, a portion of the gasket protruding outwardly beyond the front wall;

forming a groove in an inner surface of the door for engaging with the gasket, the gasket compressing within the groove to seal between the door and the enclosure; and venting the enclosure with a lower exterior opening in the enclosure which is in communication with an upper interior opening in the enclosure by a passage extending therebetween.

* * * * *